2,766,103
Patented Oct. 9, 1956

2,766,103

PROCESS OF PRODUCING SILICON SULFIDE

Morris L. Nielsen, Centerville, Ohio, and Joseph S. Dunn, Rochester, N. Y., assignors to Monsanto Chemical Company, St. Louis, Mo., a corporation of Delaware No Drawing. Application December 2, 1953, Serial No. 395,837

2 Claims. (Cl. 23—206)

The present invention relates to methods of preparing silicon compounds and deals more particularly with the process of preparing silicon sulfide.

An object of the present invention is to prepare silicon sulfide in good yields from silicon, silica and sulfur. Another object of the invention is to prepare porous, friable products comprising the silicon sulfide. Still another object of the invention is the preparation from silicon, sulfur and silica an ignition product which upon treatment with alcohols gives orthosilicates and substantially no polysilicates.

These and other objects of the invention which will be hereinafter disclosed are provided by the present invention wherein there is ignited a mixture of silicon, silica and sulfur in proportions of at least 2 moles of sulfur per mole of silicon and less than 1 mole of silica per mole of silicon.

The production of silicon sulfide from silicon and sulfur is well-known in the art; however, industrial utility of such prior art processes has been hampered by the formation of a hard and very difficultly comminuted mass as the ignition product of silicon and sulfur. The silicon sulfide generally may be isolated from the dense reaction mass only by sublimation at reduced pressure. In the copending application of Iral B. Johns, Jr., Serial No. 223,447 filed April 27, 1951, now Patent No. 2,680,098, there is disclosed ignition of a mixture consisting of one mole of silicon, one mole of silica and 2 moles of sulfur to give a readily crushed reaction product. While the Johns' process results in the production of a friable mass, it is unsuitable for the preparation of silicon sulfide in good yields because together with the sulfide in the Johns' process there is obtained a considerable quantity of a compound containing the elements silicon, oxygen and sulfur. Upon treatment with an alcohol the Si—O—S compound is converted to a polysilicate, rather than to an orthosilicate. Hence, when the ignition product is to be used as an intermediate for the preparation of only orthosilicates the product of the Johns' process is unsuitable.

Reaction of a mixture of silicon and sulfur which has been layered with glass or glass wool as described in the Alvarez-Tostado et al. U. S. Patent No. 2,589,653 may lead to readily crushable masses but the rapidity of the reaction thus effected occasions difficulty in the control thereof when employed on an industrial scale.

Now we have found that when there is employed in a mixture of silicon, sulfur and silica a quantity of the silica which is less than the molar equivalent with respect to the silicon, ignition of the mixture leads to the formation of a desirably easily crushed product and at the same time suppresses substantial formation of the Si—O—S compound. Treatment of the ignition mass with alcohols leads to substantially theoretical yields of orthosilicates and substantially no polysilicates.

As is known in the art, the reaction of silicon and sulfur is exothermic; however, in the present instance in order to initiate the reaction it may be advantageous to employ in the reaction mixture a small quantity, say from 0.5% to 5.0% by weight of an auxiliary heat-producing substance based on the total weight of the mixture of silicon, silica and sulfur. The peroxides of barium, sodium or potassium are particularly suitable for this purpose but other solid heat-producing media may be employed.

Ignition of the mixture of silicon, sulfur and silica and, as desired, heat-producing agent may be effected by subjecting it to a temperature of say, at least 2000° C. and preferably of at least 2500° C. to 3500° C. Temperatures of this magnitude may be readily attained by employing thermite ignition, i. e., by using the heat which is liberated in the reaction of a mixture of aluminum and an oxide of a weaker metal. The charge of silicon, silica and sulfur may be placed into a highly heat-resistant vessel, e. g., a fire clay crucible or a Pyrex container; and the thermite, say, a mixture of aluminum and ferric oxide placed in the charge. The mixture is then ignited electrically and/or by a primer such as a magnesium ribbon. Heat evolved in the thermite reaction then assists ignition of the silicon-silica-sulfur charge. The product of this ignition is generally a brownish, friable material which contains no elemental silicon and substantially no Si—O—S compound.

This ignition product may be employed directly without further treatment or isolation of constituents for the preparation of organic esters of ortho-silicic acid.

Reaction of the ignition product with an alcohol for formation of the orthosilicates is effected by simply contacting the ignition product with the hydroxy compound and allowing the resulting mixture to stand at ordinary or increased temperatures until formation of the silicates, as evidenced by cessation of hydrogen sulfide evolution is complete. Advantageously, increased temperatures, say, the refluxing temperatures of the mixture of ignition product and hydroxy compound, are used. In order to assure complete reaction of the ignition product an excess of the hydroxy compound may be advantageously employed. The reaction product thus obtained will contain unreacted hydroxy compound, which is readily removed from the esterification mixture by distillation. The orthosilicates are useful for a wide variety of commercial purposes, for example in the preparation of heat-resistant adhesives, coatings, water-proofing agents, functional fluids, etc.

The invention is further illustrated, but not limited, by the following examples:

Example 1

125 grams of a mixture of silicon, silica, sulfur and barium oxide in which the $Si:SiO_2:S$ molar ratio was 1:0.5:2 and in which the barium peroxide was present in the amount of 3 g. of $BaO_2$/mole of Si, were placed in a Pyrex tube (40 mm. O. D. x 105 mm. long). The tube was placed in a fire clay crucible, wherein it was supported upright, glass wool packing being employed between it and the crucible to serve as insulation. A thermite booster, ¼ inch to ⅜ of an inch in diameter, extended through the center of the charge from top to bottom. The booster was ignited with a burning magnesium ribbon. After ignition was complete the product was allowed to cool. The cooled reaction product consisted of 120.2 g. of a mixture of a brown, semi-fused mass and a white, powdery silicon sulfide which formed as a sublimate on the upper walls of the reactor. The brown mass was readily broken up in a mortar. An intimate mixture of the white powdery material and the crushed mass was heated with 200 ml. of ethanol for about an hour at a temperature of 80° C. Distillation of the resulting reaction mixture gave 138.9 g. of tetraethyl orthosilicate and substantially no polysilicates.

Example 2

This example shows ignition of a mixture of silicon, silica and sulfur having a smaller proportion of silica than that in Example 1.

A mixture consisting of 28 g. of silicon, 15 g. of silica, 64 g. of sulfur and 3 g. of barium peroxide was ignited as in Example 1. The product obtained was a mixture of white powdery silicon sulfide and a brown fused mass. It was readily broken up in a mortar, mixed with the powdery sulfide and treated with ethanol as in Example 1 to give 129.3 g. of tetraethyl orthosilicate. Whereas the yield of orthosilicate in this experiment was not so good as that obtained in Example 1, it is apparent that by the ignition of the 1:.25:2 molar mixture of silicon, silica and sulfur the predominant product is silicon sulfide. Besides the 129.3 g. of the orthosilicate there was obtained in this run 15 g. of material boiling at above 110°/10 mm. Of this, 12.5 g. was probably a mixture of polysilicate B. P. 110-138° C./10 mm. and the remainder a black charred residue.

Example 3

This example shows ignition of silicon with sulfur in the absence of silica. A mixture consisting of 28 g. of silicon, 70 g. of sulfur and 3 g. of barium peroxide was ignited as in Example 1. There was obtained upon cooling a white, fluffy sublimate of silicon sulfide and a dense, fused gray mass. The latter was broken up with much difficulty in a mortar and mixed with the sublimate. The resulting mixture was treated with 200 ml. of ethanol, as in Example 1, except that the reaction mixture was kept at the 80° C. temperature for 3 hours owing to continued evolution of hydrogen sulfide, and there was thus obtained 54 g. of tetraethyl orthosilicate. The low yield of the othosilicate was probably due to the physical structure of the ignition product.

Example 4

This example shows heating of silicon, silica, sulfur, and barium peroxide in which mixture the silica is present in a molar equivalent in respect to silicon and sulfur is present in twice the molar quantity.

The ignition was conducted substantially as in Example 1 and yielded upon cooling a product which was readily broken up in a mortar. Upon refluxing this material with ethanol as in Example 1, there was obtained a product which consisted of substantially 50% by weight of tetraethyl orthosilicate with the remainder being a polymeric ethyl silicate.

What we claim is:

1. The process of producing silicon sulfide which comprises igniting a mixture of reactants consisting of one mole of silicon, substantially up to approximately 0.5 mole of silica and 2 moles of sulfur, in the presence of from 0.5% to 5.0% by weight, based on the total weight of the mixture of silicon, silica and sulfur, of a peroxide selected from the class consisting of barium, sodium and potassium peroxides.

2. The process of producing silicon sulfide which comprises igniting a mixture of reactants consisting of one mole of silicon, substantially up to approximately 0.5 mole of silica and 2 moles of sulfur, in the presence of from 0.5% to 5.0% by weight of barium peroxide, based on the total weight of the mixture of silicon, silica and sulfur.

References Cited in the file of this patent
UNITED STATES PATENTS

| | | |
|---|---|---|
| 2,589,653 | Tostado et al. | Mar. 18, 1952 |
| 2,680,098 | Johns | June 1, 1954 |